United States Patent [19]

Murray

[11] 4,210,992
[45] Jul. 8, 1980

[54] METHOD OF MAKING A MOLDED PLASTIC BOWLING PIN

[76] Inventor: George G. Murray, R.D. 5 Box 28, Jackson, N.J. 08527

[21] Appl. No.: 919,326

[22] Filed: Jun. 26, 1978

Related U.S. Application Data

[62] Division of Ser. No. 757,480, Jan. 6, 1977, Pat. No. 4,123,057.

[51] Int. Cl.² .................. B29D 27/00; B29D 9/10; B32B 1/06
[52] U.S. Cl. ................................. 29/525; 264/328; 264/261; 264/278; 273/82 R; 156/245
[58] Field of Search ................ 156/245; 264/271, 279, 264/328, 261, 278; 273/82 R, 82 A, 82 B; 29/525

[56] References Cited

U.S. PATENT DOCUMENTS

| | | | |
|---|---|---|---|
| 2,797,923 | 7/1957 | Dettman | 273/82 R |
| 2,942,885 | 6/1960 | Fontevelli | 273/82 R |
| 3,229,977 | 1/1966 | Guglielmo | 273/82 R |
| 3,329,430 | 7/1967 | Wanders | 273/82 R |
| 3,332,685 | 7/1967 | Halip | 273/82 R |
| 3,971,837 | 7/1976 | Hasegawa et al. | 273/82 R |
| 3,984,104 | 10/1976 | Negrini | 273/82 R |
| 4,012,386 | 3/1977 | Davis | 273/82 R |

*Primary Examiner*—Caleb Weston
*Attorney, Agent, or Firm*—Hubbell, Cohen, Stiefel & Gross

[57] ABSTRACT

A molded plastic bowling pin incorporating a core extending the length of the pin substantially from its base to its head and constituted of a plurality of plastic core elements of varying sizes and shapes such that the composite pin incorporating the same meets the weight distribution standards set by the American Bowling Congress, and a shell defining the external configuration of the pin, the shell having a substantially uniform thickness about the core elements and being integrally molded on and firmly bonded thereto. The pin is manufactured by assembly of the internal core from the individual plastic core elements having the predetermined, desired weight distribution, and thereafter injection molding the shell directly thereon to define the composite, integrally molded bowling pin.

2 Claims, 4 Drawing Figures

METHOD OF MAKING A MOLDED PLASTIC BOWLING PIN

This is a division, of application Ser. No. 757,480, filed Jan. 6, 1977, now U.S. Pat. No. 4,123,057.

BACKGROUND OF THE INVENTION

This invention relates to a bowling pin and more particularly to an integrally molded plastic bowling pin which simulates a wooden pin, and which may be readily and inexpensively manufactured.

Plastic bowling pins have been frequently described in the patent literature over the past 15 years or more. For example, such pins, and methods for the manufacture thereof, are described in Gambino U.S. Pat. No. 3,037,771 of June 5, 1962; Friedman U.S. Pat. Nos. 3,044,777 and 3,048,400 of June 17 and Aug. 7, 1962; Dulmage U.S. Pat. No. 3,109,201 of Nov. 5, 1963; Ernst U.S. Pat. No. 3,169,766 of Feb. 16, 1965; Halip U.S. Pat. No 3,332,685 of July 25, 1967; and Negrini U.S. Pat. No. 3,572,710 of Mar. 31, 1971.

These patents disclose, inter alia, bowling pins of separate molded plastic components defining internal recesses which may incorporate weight elements to impart desired mass distribution or sound-modifying characteristics to the pin. Many of the products so described are, however, relatively complex, and are both difficult and expensive to manufacture on a commercial basis. Moreover, pins of the type described in these references are manufactured by initially molding their hollow outer shells, and thereafter mounting the internal weighted elements therein. The weight elements within such pins may be knocked loose upon impact, thus varying the weight distribution of the pin and precluding its further use.

It is among the objects of the present invention to provide an integrally molded plastic bowling pin which duplicates the desired characteristics of the more expensive, scarce wooden pins, which meets all of the requirements of the American Bowling Congress, and yet which is relatively simple in construction.

A further object of the invention is to provide a method for the manufacture of such an integrally molded plastic bowling pin which may be simply and efficiently carried out on a commercial scale.

These and other objects and advantages of the invention will be apparent from the following description thereof, taken in connection with the accompanying drawing illustrating a preferred embodiment of the integrally molded plastic bowling pin hereof and in which:

SUMMARY OF THE INVENTION

In accordance with the present invention, an integrally molded plastic bowling pin is provided having a base, side walls, belly, neck and head, and comprising a core extending lengthwise of the pin from the base into the head, constituted of a plurality of molded plastic elements of varying sizes and shapes having a weight distribution such that the pin meets the standards set by the American Bowling Congress (ABC); an integrally molded shell formed on the core and firmly bonded thereto, the shell having a substantially uniform thickness about the core, defining the external configuration of the side walls, belly, neck and head of the pin, and providing a cavity adjacent the bottom of the core; and a bottom member defining the base of the pin and press-fitted into the cavity defined by the shell adjacent the core bottom.

The pin construction hereof is readily and efficiently manufactured by forming the desired core and thereafter injection-molding the outer plastic material shell directly thereon, the shell bonding to and being formed integrally with the core; and press-fitting a bottom member into the cavity defined intermediate the bottom of the core and the outer shell to define the desired integral, molded pin. By thus molding the shell of the composite pin directly on the pre-selected, weight-distributed core elements advantage is taken of the tendency of thermoplastic materials to shrink upon cooling within a mold, the shell thus forming a strong, shrink-tight bond about the core and the composite pin being formed without internal voids. Moreover, by pre-selecting the size, shape and density of the internal core elements, it is possible to assure that pins thus produced will comply with the ABC technical specifications respecting center of gravity, radius of gyration, scoreability and the like. [ABA Technical Specifications for a Nonwood (Synthetic) Tenpin, Oct. 8, 1962]. Moreover, such integrally molded pins simulate the "bounce" and sound characteristics exhibited by wooden pins.

It has been found possible to obtain these results, in accordance with the present invention, by providing the weight-distributed core elements substantially throughout the entire length of the composite plastic pin, and by integrally molding the substantially uniform thickness outer shell about the core.

Moreover, by proceeding as aforesaid the molded plastic pin may be readily manufactured without the use of complex molds, successive insert and molding operations, or the like. Thus, it will be seen that the external shell of the pin is directly injection-molded on the internal weight-distributed core and bonded directly thereto, without the necessity for utilizing any further internal molding cores or forms. The integrally molded pin may accordingly be readily and simply produced.

THE PREFERRED EMBODIMENT OF THE INVENTION

Figure 3:
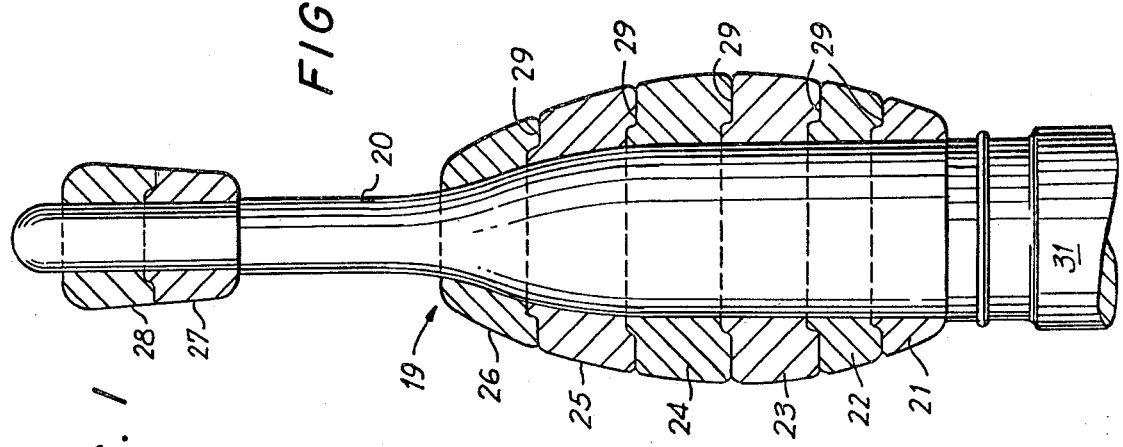
FIG. 3 is a longitudinal section of the bowling pin produced from the mold of FIG. 2 with the internal core holder removed and a permanent base element pressed into place therein.
Figure 4:
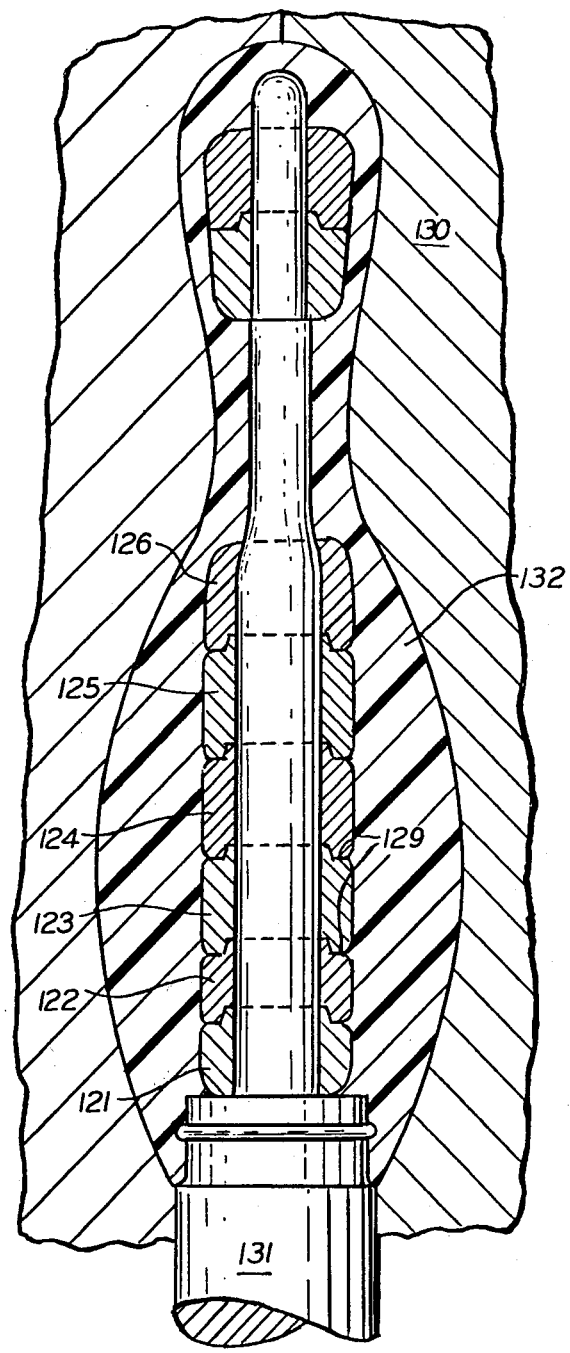
FIG. 4 is a longitudinal section of the interior of a mold cavity incorporating a core assembly and a base element facilitating manufacture of the integrally molded plastic pin.

The bowling pin structure illustrated in FIG. 3 embodies the typical external configuration of a bowling pin, having a base 11, side walls 12, a belly 13, a neck 14 and a head 15. The integrally molded pin of the present invention further incorporates a central core 16 extending lengthwise of the pin from adjacent the base region 11 into the head 15 thereof, an integrally molded, substantially uniform thickness shell 17 firmly bonded thereto and defining the aforesaid external configuration of the pin, and a bottom member 18 defining the base of the pin, this composite structure possessing a weight distribution meeting the standards set by the American Bowling Congress and simulating the "bounce" and sound characteristics exhibited by a wooden pin upon impact by a bowling ball or another pin.

Figure 1:
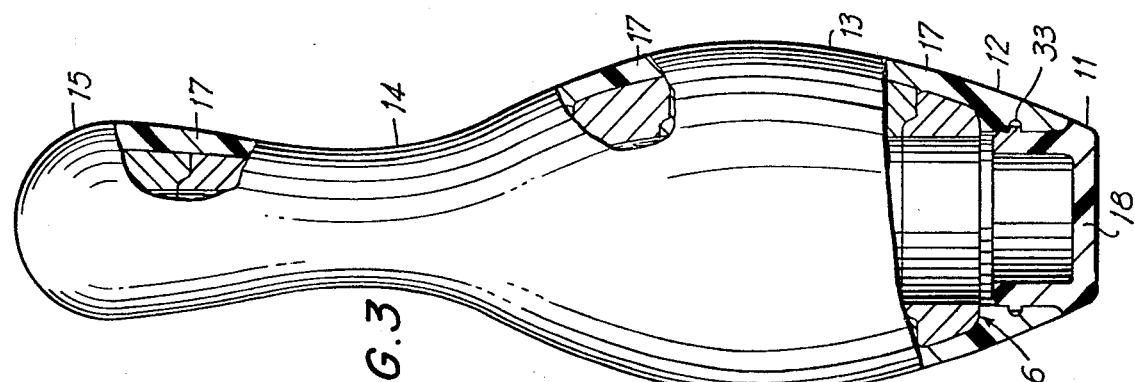
FIG. 1 is a longitudinal section through a preferred form of core assembly which may be utilized in the manufacture of the integrally molded plastic bowling pin of the present invention.
Figure 2:
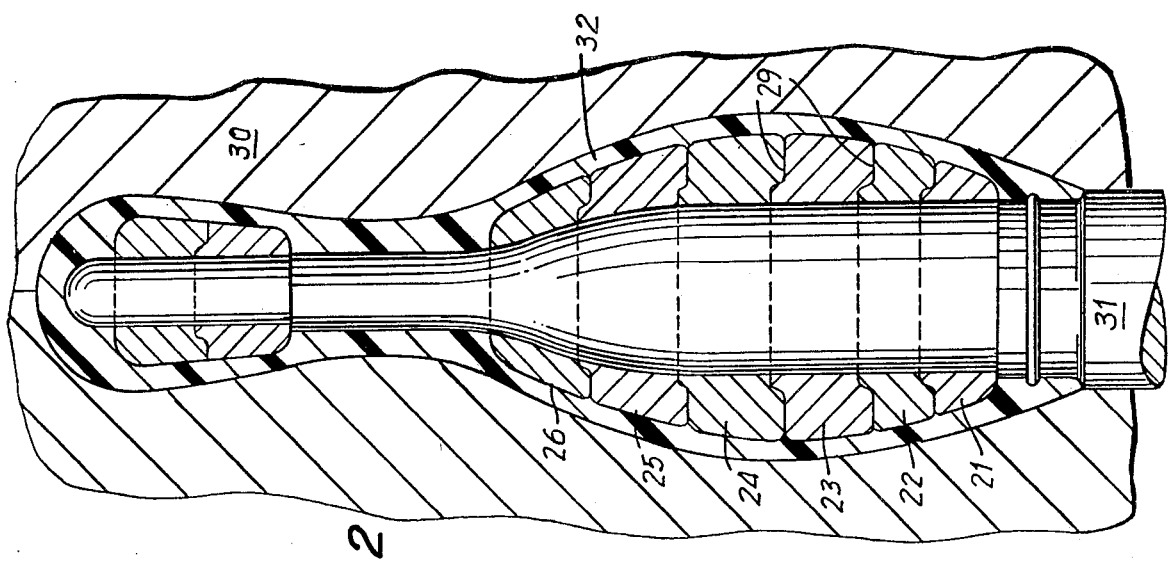
FIG. 2 is a longitudinal section of the interior of a mold cavity incorporating the core assembly of FIG. 1 and a base element form facilitating manufacture of the integrally molded plastic bowling pin.

The structure of the molded bowling pin of the invention will be apparent from consideration of the successive stages in the manufacture of the preferred embodiment thereof illustrated in FIGS. 1-3 of the drawing. As shown in FIGS. 1 and 2, the composite pin structure hereof may suitably be manufactured employing a core assembly designated generally at 19 in FIG. 1. That assembly is provided by mounting a plurality of individual molded plastic core elements 21-28 about an internal, removable core holder 20.

Core holder 20 is a steel or similar support upon which the individual core elements are mounted for molding. The core holder may be hollow to permit the passage of heat transfer media therethrough during the molding operation to facilitate curing of the thermoplastic resins utilized therein. Further, the core holder is so shaped or constructed as to facilitate its subsequent removal from the mold. Thus, for example, core holder 20 may be tapered and/or may be provided with successive shoulders or steps for mounting the sequential individual core elements 21-26 and 27-28 in predetermined relation thereon. Other means for mounting the several core elements to the core holder, and other configurations of the core holder designed to facilitate such mounting will, of course, be apparent to those skilled in the molding art.

In the preferred embodiment of the invention illustrated the individual core elements are annular or ring-like members having varying shapes and sizes, and, if desired, densities, to facilitate compliance of the molded pin manufactured therefrom with the aforesaid ABC technical specifications. The core elements may be constituted of any of a wide variety of elastomeric resins, e.g., ethylene polymers such as polyethylene, polypropylene, EP copolymers, EPT terpolymers, EVA polymers or the like; nylons; acetal polymers, polyurethanes, polycarbonates, ABS or GRS rubbers, or the like. Desirably, the polymeric formulations are filled to varying degrees with mineral fillers, e.g., calcium stearate, titanium dioxide, glass fibers or beads, silicas, talcs or the like.

The core elements incorporate mating shouldered portions 29 which support the successive elements in registered relation for mounting on core holder 20, and define a substantially uniform surface about which the shell 17 may be molded. The shouldered portions may, if desired, be so configured as to provide a slight intermediate space between each of the successive core elements. The provision of such spacing facilitates the flow of the thermoplastic resinous material between the respective core elements during molding to insure the formation of an integral, strongly bonded, composite structure without internal voids.

As shown in FIG. 2 the composite core assembly 19 comprising core holder 20 and the multiple core elements 21-28 is thereafter placed within a suitable injection mold cavity, designated generally at 30. The cavity is sealed with an appropriate base element 31 which mounts the core holder therein.

An annular space 32 is thereby defined between the core assembly 19 and mold cavity 30 in which the shell 17 of the composite pin is formed during the molding operation. The shell may suitably be molded of the same resin constituting the core elements, or one which is compatible therewith and firmly bonds thereto. Further, the thermoplastic resin so utilized must be a high impact strength material such that the shell produced therefrom has an outer surface which is softer than that of a bowling ball, is self-lubricating and yet which possesses adequate durability and strength and, as indicated hereinabove, when impacted by a bowling ball or another pin simulates the "bounce" and sound characteristics of wooden pins.

Materials which may be thus utilized to comprise the shell include resins having higher impact strengths than those constituting core 16. Materials so useful include, e.g., polyethylenes and polypropylenes having specific gravities in excess of about 0.9, or other high molecular weight ethylene polymers, e.g., EP copolymers, EPT terpolymers or EVA copolymers; nylons, polyurethanes, ABS copolymers, polycarbonates or other resins which, as indicated hereinabove, may be injection-molded and firmly bonded to the core elements 21-28. Conventional pigments or fillers or other additives may be incorporated in the shell formulation for esthetic or other purposes, so long as the shell meets the aforesaid criteria, viz., is integrally molded to and bonds with the internal core and, together therewith, exhibits the requisite weight distribution, and "bounce" and sound-producing characteristics upon impact.

Shell materials thus constituted may be molded about the core employing conventional injection-molding operations, the shell upon cooling shrinking about the internal core and strongly bonding thereto without the formation of any internal voids. Moreover, as aforesaid, by appropriately shaping the successive core elements relative to one another and relative to the internal configuration of mold cavity 30, the shell 17 is provided with a substantially uniform thickness substantially throughout the length of the composite molded pin.

After molding, the mold is opened, the base member 31 and the core holder 20 removed from the composite molded article, and the bottom member 18 is fitted into the resulting cavity to define the base of the composite pin. The bottom member may be a pre-molded element comprising any of the aforesaid resinous materials, e.g., an impact-resistant nylon, and may define an outer, annular rib 33 adapted to engage a mating groove formed during the molding operation to provide the final product. The bottom member 18 being subjected to considerable stress during usage, may thereby be periodically replaced without impairing the durability or lifetime of the pin itself.

The molded pin product illustrated in FIG. 3 suitably incorporates a core which may extend from 60 to 90 percent of the length of the pin (including both the core belly elements 21-26 and core neck elements 27 and 28) and a shell which may vary from about 5 to 25 percent of the pin cross-section in the region of its neck to from about 10 to 80 percent of its cross-section in its belly region. The specific shell thickness and core dimensions will, of course, vary, depending upon the specific dimensions of the pin in question, the particular compositions utilized, and the like. Conventional ten pins manufactured in accordance herewith may, for example, incorporate a shell having a substantially uniform thickness of about one-quarter inch.

It will be understood that the present invention is applicable to molded plastic bowling pins of any specific configuration, including duck pins, candle pins, five pins, ten pins and the like. Since the external configuration or other modifications may thus be made in the preferred embodiments shown and described herein without departure from the scope of the invention, it will be understood that the invention embraces all such changes, modifications and equivalents as are within the scope of the following claims.

What is claimed is:

1. A process for the manufacture of a bowling pin having a base, side walls, belly, neck and head, which comprises:
    (a) assembling a core of molded filled polymer elements extending lengthwise of the pin from the base into the head and constituted of a plurality of molded annular filled polymer elements of varying sizes and shapes having a weight distribution such that the pin meets the standards set by the American Bowling Congress by mounting said molded filled polymer elements on an internal core holder extending substantially the desired length of said pin;
    (b) injection-molding a plastic material shell directly on the core, the shell bonding to and being formed integrally with the core and providing the side walls, belly, neck and head of the pin and providing a cavity adjacent the bottom of the core;
    (c) removing the core holder from the composite molded article following step (b); and
    (d) fitting an independent, impact-resistant plastic material base element into the cavity to define the base of said pin.

2. The process of claim 1, wherein the core holder is so shaped as to support the adjacent molded filled polymer elements annularly thereof with said elements spaced slightly from one another such that during the injection-molding step (b) the plastic material is injected about and between the plurality of filled polymer elements to form a strong bond therewith without internal voids.

* * * * *